United States Patent [19]

Riecke

[11] 4,091,523

[45] May 30, 1978

[54] RIGID METAL CONDUIT UNION

[76] Inventor: Roy C. Riecke, 3303 W. Denison Ave., Davenport, Iowa 52806

[21] Appl. No.: 782,586

[22] Filed: Mar. 29, 1977

[51] Int. Cl.$^2$ .................. B23P 19/00; F16L 55/00
[52] U.S. Cl. ................... 29/526 R; 285/175; 285/404; 285/417; 174/84 S
[58] Field of Search ............... 285/175, 1 L, 404, 90, 285/417, 403, 161, 32, 19, 195; 403/36 L; 151/24; 85/1 SS, 33; 248/354 U, 354 S, 405, 413; 16/DIG. 24; 174/84 S, 65 R; 29/157 R, 526

[56] References Cited

U.S. PATENT DOCUMENTS

| 499,815 | 6/1893 | Williams | 285/404 X |
|---|---|---|---|
| 1,000,043 | 8/1911 | Scism | 285/404 |
| 1,113,520 | 10/1914 | Ward | 285/404 |
| 1,308,853 | 7/1919 | McVoy | 285/404 X |
| 1,956,713 | 5/1934 | Fischer | 285/404 |
| 2,472,307 | 6/1949 | Nagel | 285/404 X |

FOREIGN PATENT DOCUMENTS 1,377,087  9/1964  France .................. 285/404

Primary Examiner—Dave W. Arola
Attorney, Agent, or Firm—Henderson, Strom, Sturm, Cepican & Fix

[57] ABSTRACT

A sleeve having first and second interior surface portions. The first surface portion is threaded and communicates with one open end of the sleeve, and the second surface portion is smooth and communicates with the opposite open end of the sleeve. A bore is formed through the sleeve and the second surface portion thereof, and a set screw is threaded into the bore. The sleeve is first slipped, and then threaded, onto a first conduit, the conduit being first received by the smooth interior surface and then by the threaded interior surface. The end of a second conduit is then disposed adjacent the sleeve, and the sleeve is screwed back off the first conduit onto the second conduit until the first conduit is received by the smooth interior surface and the second conduit by the threaded interior surface. The set screw is threaded against the first conduit.

1 Claim, 5 Drawing Figures

RIGID METAL CONDUIT UNION

BACKGROUND OF THE INVENTION

This invention relates to couplings for metal tubing or pipe. More particularly, this invention relates to structures for joining metal raceways employed in the installation of electrical conduits. Examples of such metal raceways are those defined in the National Electrical Code at Article #345 — "Intermediate Metal Conduit" and at Article #346 — "Rigid Metal Conduit."

Often it occurs during the installation of electrical conduits that offset rigid metal raceways or conduits must be employed and joined in order to complete a conduit run. Because of the offset in the conduits, the conduits cannot simply be rotated about a single longitudinal axis and thereby threaded into opposite ends of a common straight coupling. Another problem commonly arising, particularly where a conduit run is being broken into, is the need to join two conduits neither of which can be turned about its longitudinal axis.

In both of the foregoing situations, two types of couplings are commonly employed. One type of coupling is a split coupling, having two pieces which are placed over the point of junction of the two conduits and four bolts with nuts which interconnect the two pieces. The second type of coupling is commonly called the "Erickson" coupling and has three portions. A first sleeve, having an interior flange and an interior threaded surface, is slipped over the end of one of the conduits, and a second sleeve is threaded onto the end of the same conduit. A third sleeve, having an interior threaded surface and an exterior flange and threaded surface, is threaded onto the end of the second conduit. The first sleeve is then slipped back along the first conduit, over the second sleeve, and threaded onto the third sleeve, a tight coupling being obtained when the first sleeve is threaded against the exterior flange of the third sleeve and the second sleeve abuts against the interior flange of the first sleeve.

Both of the aforementioned types of coupling are comprised of a large number of parts, which parts can easily be misplaced on a job site. Also, both of the couplings are time-consuming to employ and are particularly awkward to use where there is tiering of conduits, multiple levels of conduit installed and closely spaced. The "Erickson" coupling requires the use of a large pipe wrench, and the split coupling the use of two open-end wrenches, for installation, and space limitations therefore can severely impair the efficiency with which these couplings may be employed.

SUMMARY OF THE INVENTION

A union has a set screw and an elongated sleeve with open ends. Adjacent one end the sleeve has a threaded interior surface portion, and a smooth interior surface portion is disposed adjacent the opposite end of the sleeve. The threaded and smooth interior surfaces meet intermediate the ends of the sleeve. A bore is formed through the sleeve and smooth interior surface thereof, the set screw being threaded into the bore.

The union is first slipped, and then threaded, onto a first conduit, the conduit being first received by the smooth interior surface and then by the threaded interior surface. The end of a second conduit is then disposed adjacent the union, and the union is screwed back off the first conduit onto the second conduit until the first conduit is received by the smooth interior surface and the second conduit by the threaded interior surface. The set screw is threaded against the first conduit.

It is an object of this invention to provide a union which more efficiently and effectively accomplishes the joining of rigid metal conduits which are offset or which are otherwise not readily rotatable about their longitudinal axes.

Another object of this invention is to provide a union which requires the employment of fewer and less bulky tools whereby electrical conduits can be joined quickly even where there is tiering of conduits.

Still another object of this invention is to provide a union having a minimum number of parts, whereby handling of the union on a job site without loss of parts is greatly facilitated, and whereby fabrication of the union requires fewer materials and less time and energy, yet remaining capable of attaining the aforementioned objects.

These objects and other features and advantages of the rigid metal conduit union of this invention will become readily apparent upon referring to the following description, when taken in conjunction with the appended drawing.

BRIEF DESCRIPTION OF THE DRAWING

The rigid metal conduit union of this invention is illustrated in the drawing wherein.

DESCRIPTION OF THE PREFERRED EMBODIMENT

Figure 1:
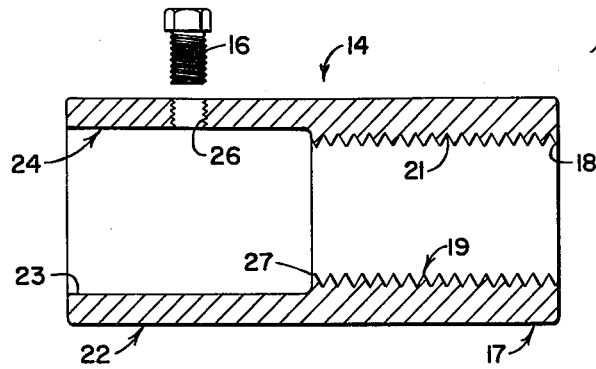
FIG. 1 is a side elevational view of the union, the sleeve member thereof being shown in longitudinal section.
Figure 4:
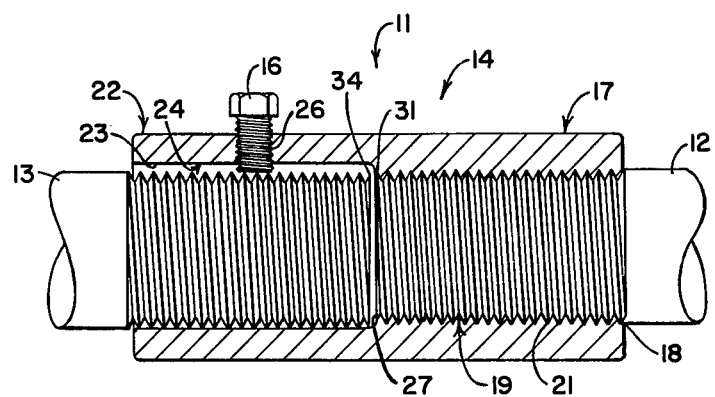
FIG. 4 is a fragmentary, side elevational view, partially in section, showing the coupling of two rigid metal conduits by the union of this invention.
Figure 5:
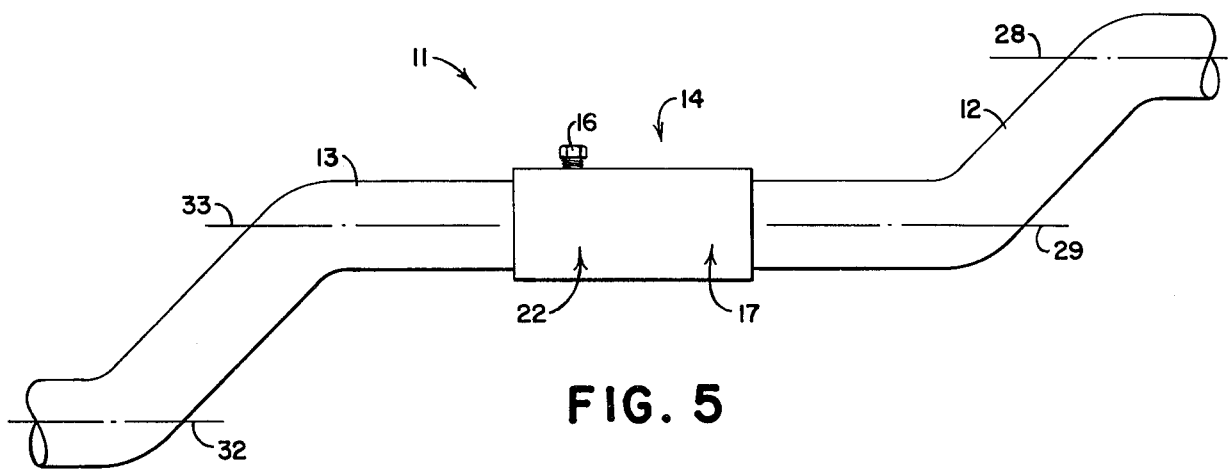
FIG. 5 is a reduced, fragmentary side elevational view showing offset conduits joined by the union of this invention.

The rigid metal conduit union of this invention is indicated generally at 11 in FIG. 1. The union at 11 in FIGS. 4 and 5 is shown joining rigid metal conduits 12, 13. The union 11 more particularly includes a sleeve member 14 and a set screw 16.

Figure 2:
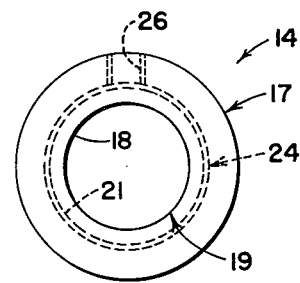
FIG. 2 is an end elevational view of the sleeve member showing the end adjacent the threaded interior surface portion thereof.
Figure 3:
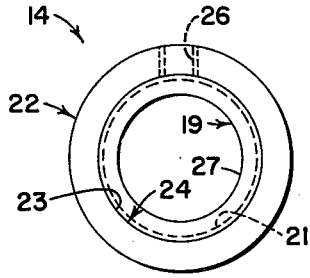
FIG. 3 is an end elevational view of the sleeve member showing the end adjacent the smooth interior surface portion thereof.

Referring now to FIGS. 1, 2 and 3, the sleeve member 14 is generally elongated and cylindrical in conformation and has an interior longitudinal space formed therethrough. The sleeve 14 has a first portion 17 including an open end 18 which communicates with the interior longitudinal space. The portion 17 also includes a threaded interior surface 19 extending from the end 18 into the union 11. A first inside diameter is defined by the deepest portions 21 of the threaded surface 19.

The sleeve member 14 also has a second portion 22. The portion 22 includes an open end 23, opposite end 18, which also communicates with the interior longitudinal space. The portion 22 further includes a smooth interior surface 24 extending from end 23 into the union 11. A threaded bore 26 is formed through the sleeve 14 and surface 24 thereof to communicate with the interior longitudinal space. The surface 24 defines a second inside diameter which is slightly greater than the first inside diameter. The first and second portions 17, 22 are contiguous, the interior surfaces 19, 24 meeting at interior opening 27 between the ends 18, 23.

The set screw 16 is threaded and is removably received by the bore 26. The set screw 16 may be threaded into the bore 26 such that the screw 16 extends into the interior longitudinal space.

The operation of the union 11 is shown in FIGS. 4 and 5. Frequently on a job site, an electrician must take standard rigid electrical conduits and form offsets therein in order to complete the running of a conduit line. Rigid metal conduits 12, 13 have main longitudinal axes 28, 32, but offsets have been formed therein such that the conduits 12, 13 have portions with secondary longitudinal axes 29, 33. The threaded ends 31, 34 of the conduits 12, 13 are disposed on the offset portions. It is apparent that rotation of the offset portions about axes 29, 33 would result in the main portions of the conduits 12, 13, aligned along axes 28, 32, to travel about the secondary axes 29, 33. The conduits 12, 13 therefore cannot be joined readily by threading into a standard straight coupling.

The set screw 16 of the union 11 is moved within the bore 26 such that the screw 16 does not project into the interior longitudinal space of the sleeve 14. The sleeve 14 is then slipped onto the conduit 13, the threaded end 34 being slidably received by the smooth surface 24. Next the sleeve 14 is rotated, the end 34 being received by the threaded surface 19 until the end 34 is flush with the open end 18. The threaded end 31 of conduit 12 then is disposed adjacent end 18. The sleeve 14 thereafter is rotated such that the threaded surface 19 disengages from end 34 and engages end 31. When the end 31 of conduit 12 has been received by surface 19, the end 34 is disposed against surface 24, and the set screw 16 is threaded through the bore 26 and against the conduit 13. The conduits 12, 13 are illustrated in a final, secured position within the union 11 in FIGS. 4 and 5.

Where a conduit line is broken into, the conduits 12, 13 may not be offset, but rather disposed completely along a main longitudinal axis. Nevertheless, the already installed conduits 12, 13 are not readily rotatable about their longitudinal axes. Employment of the union 11 in the manner aforementioned readily joins the conduits 12, 13.

The outside diameters of the conduits 12, 13 are the same and are substantially the same as the first inside diameter defined by the portions 21. The second inside diameter is slightly greater whereby a conduit 12 or 13 may slide by the surface 24. No tool is required for the application of the union 11 except a small pliers or the like to aid in the final tightening of the set screw 16. The union 11, having a sleeve member 14 and a set screw 16 which can be carried at all times in bore 26, provides a coupling which minimizes loss of parts on a job site. Offset conduits or fixed conduits which cannot be turned are readily joined by the union 11 with an economy of effort and time on the part of the electrician.

Required movement of the conduits being joined is minimized, and little room is required for use of the union 11, thereby particularly adapting it to situations where electrical conduits have been tiered. The uniform outside diameter, and the moderate thickness of the wall of the sleeve 14 facilitates the aforementioned adaptation. Also, the sleeve 14 may be modified by having the second portion 22 lengthened, the bore 26 being disposed farther from the interior opening 27, such that the set screw 26 screws against the smooth exterior surface of conduit 13, rather than against the threaded portion 34 as illustrated in FIG. 4, thereby more securely holding the conduit 13.

Although a preferred embodiment has been disclosed herein, it is to be remembered that various modifications and alternate constructions can be made thereto without departing from the full scope of the invention, as defined in the appended claims.

I claim:

1. A method of coupling two rigid metal conduits, each conduit having a free threaded end comprising:

disposing a union adjacent the free threaded end of the first conduit, said union having a longitudinal interior space formed therethrough and open first and second ends communicating with said space, said union having a smooth, first interior surface disposed about said space and communicating with said first end, said union having a threaded, second interior surface disposed about said space and communicating with said second end, said first and second interior surfaces meeting between said ends, said union having a bore formed therethrough, through said first surface, and communicating with said space, said union having a set screw disposed in said bore, said first end being disposed adjacent the free threaded end of the first conduit;

sliding the union over the first conduit, the free threaded end of the first conduit being slidably received by said first interior surface;

threading the union by rotation thereof upon the first conduit, the free threaded end being received by said second interior surface, the first conduit extending through said union flush with said second end;

disposing the free threaded end of the second conduit adjacent said second end;

threading the union by rotation thereof onto the second conduit, the free threaded end of the second conduit being received by said second surface, the free threaded end of the first conduit being disengaged from said second surface;

terminating rotation of the union when the free threaded end of the second conduit is received by said second surface and the free threaded end of the first conduit is received by said first surface; and moving said set screw into said bore such that the set screws abuts against the first conduit.

* * * * *